United States Patent [19]

Rosenfeld

[11] Patent Number: 4,902,521

[45] Date of Patent: Feb. 20, 1990

[54] FERMENTATION PRESSURE PACK

[75] Inventor: Kurt J. Rosenfeld, London, Great Britain

[73] Assignee: BKG Holdings Limited, London, England

[21] Appl. No.: 255,166

[22] PCT Filed: Jan. 29, 1988

[86] PCT No.: PCT/GB88/00056

§ 371 Date: Sep. 28, 1988

§ 102(e) Date: Sep. 28, 1988

[87] PCT Pub. No.: WO88/05815

PCT Pub. Date: Aug. 11, 1988

[30] Foreign Application Priority Data

Jan. 29, 1987 [GB] United Kingdom ............... 8701952

[51] Int. Cl.$^4$ .................... C12G 1/00; C12G 3/00; C12C 11/00; C12C 13/00

[52] U.S. Cl. .................................. 426/112; 426/8; 426/118; 426/124

[58] Field of Search ............... 426/8, 112, 11, 118, 426/15, 124, 16, 592, 106; 99/275

[56] References Cited

FOREIGN PATENT DOCUMENTS 0071365 2/1983 European Pat. Off. .
1201183 8/1968 United Kingdom .
1323622 7/1973 United Kingdom .

*Primary Examiner*—Marianne Cintins
*Attorney, Agent, or Firm*—Caesar, Rivise, Bernstein, Cohen & Pokotilow, Ltd.

[57] ABSTRACT

A two component pressure resistant pack having a fermentation mix therein is disclosed. The pack comprises an inner bag component and an outer bag component, the inner bag component having a sealed margin about the sides thereof and the margin being folded over.

8 Claims, 2 Drawing Sheets

FERMENTATION PRESSURE PACK

The invention relates to a pressure pack especially for gaseous, e.g. carbonated liquids. One specific example of a use of a pack of the invention is in fermenting liquids to produce carbonated alcoholic drinks.

It is one object of this invention to provide a pack for the purpose specified, which is resistant to high pressure and yet which is sufficiently cheap to be disposable.

According to one aspect of the invention there is provided a two component pressure resistant pack comprising an inner bag component and an outer bag component, the inner bag component being fluidtight and formed of a flexible plastics, the inner bag component having an inlet including a pressure relief valve and having an outlet tap, the outer bag component being pressure resistant, the valve and the tap of the inner bag component protruding through holes therefor in the wall of the outer bag component, the inner bag component being arranged so that upon an increase in pressure therein caused by fermentation of a fermentation mix therein the inner bag component will expand to contact the inner wall of the outer bag component at spaced apart locations where the outer bag component then supports the inner bag component against the pressure therein while allowing for portions of the bag wall between the supported locations to expand further.

The bag components will usually but not necessarily be individual bags. Most preferably, the inner bag and the outer bag components are both generally rectangular as seen in elevation. The volume of the inner bag is not dependent on that of the outer bag and may have a volume substantially the same or greater than that of the outer bag or, if made of a material which is sufficiently flexible, the inner bag may be relatively smaller than the outer bag.

It is a preferred feature of the invention that the wall of the inner bag is formed of a material which is fluidtight, and substantially impermeable to any gases present in the inner bag or the environment. Because the inner bag must expand to its full volume and perhaps then beyond as the pressure within rises, the material therefor must have this property. Where the inner bag is sealed by heating, the material must tolerate the sealing temperature. Laminates are preferred. It is a preferred feature of the invention that hot water is added to the inner bag to sterilise the contents and for this to happen without adverse side effect it is preferred that the bag is formed of a material which is unaffected by the sterilization temperature and so too are the components of the valve and tap.

Where the wall of the inner bag is heat sealed to itself, the temperature and pressure may tend to cause a change in the properties of the wall and weaken it, and there is a risk that under pressure the seal will tend to delaminate. We have observed that the outer bag tends to expand in different directions at differential rates, and we prefer to locate the inner bag within the outer bag such that the latter will resist and contain any such tendency to delamination.

In addition, it has been observed that as the inner bag expands because of the pressures generated therein, gaps tend to develop where the outer bag has a different rate of expansion. This tendency is noticeable where the gland of the pressure relief valve extends through the hole in the outer bag and also along opposed side walls of the bag. This tendency to separation is preferably resisted, according to the invention in one or both of two ways: by locating the inlet valve in a portion of the outer bag where stresses are reduced such as a corner, and by reinforcing the outer bag by incorporating strands or strips of reinforcing material in the wall of the outer bag, especially in the region of the inlet valve and/or tap. Where the outer bag is formed of a woven material the reinforcing area can be formed by increasing the density of the fibres or by the presence of extra fibres or by the presence of materials of relatively enhanced tensile characteristics. In another embodiment, a retaining ring is mounted about the holes in the wall of the outer bag, and secured thereto.

In use, the outer bag will support the inner bag so that the user can simply add water and yeast to the pack which may then be stood or leant against a support thereafter. For this purpose the outer bag may be formed of a material or include a basal portion of high friction to prevent slip.

It is a much preferred feature of this invention that the additives are inserted into the inner bag via the inlet containing the pressure relief valve. For this purpose the valve is detachable e.g. by a thread connection to a stem or pipe protruding from the inlet, so that it can be removed to allow the addition. It is a further preferred feature of the invention that the pressure relief valve be adapted to release gaseous contents, typically carbon dioxide gas, from the inner bag as and when required. The shape and structure of the valve may vary widely, provided that it fulfills the roles of allowing access to the interior of the inner bag and resisting the pressure caused in the formation of the gaseous beverage. Additionally, where the interior of the inner bag is held under vacuum before the addition of water and yeast, the valve must maintain that vacuum. The valve may be releasably connected to the inner bag by a thread or other connection, and may stand proud of or be countersunk of the inner bag. In one embodiment the valve incorporates a plunger member which is spring biased towards a closed condition, pressure within the bag lifting the plunger off its seating against the bias of the spring to allow gas to escape.

It may be advantageous to include in the valve, visual means by which the release of the gas can be detected e.g. by causing the gas to pass as bubbles through a liquid medium located in the valve.

It is an advantage of the invention that because of the two bag construction the pack is very versatile. For example, two inner bags may be present in one outer bag, each inner bag containing a different beverage for instance one a bitter beer and the other a lager beer, each having a separate valve and tap. One inner bag may contain a beverage and the other a generator of $CO_2$, which can then be supplied to the beverage-containing inner bag either to increase the gas content thereof or to enhance the dispensing, especially over distances. In another embodiment the second inner bag is empty but may be filled with tap water or other medium to apply pressure to the first inner bag.

In the description so far, we have described a pack in which there are separate outer and inner bags. It is within the scope of the invention to provide an outer bag of suitable material and applying an inner lining or coating to the inner surface thereof to define the inner bag component so that the one wall defines both outer bag and inner bag components, the valve and tap being fitted as required.

In another aspect, the invention provides a method of fermenting a gaseous beverage, the method comprising removing the pressure relief valve from the inlet thereof, adding water and yeast to the inner bag, replacing the valve, agitating the fermentation mix and allowing the mix to ferment.

The yeast and water will be added in known manner. The agitation may be by shaking of the liquid mix or stirring or the like.

In order that the invention may be well understood it will now be described by way of example only with reference to the accompanying diagrammatic drawings, in which.

Figure 1:
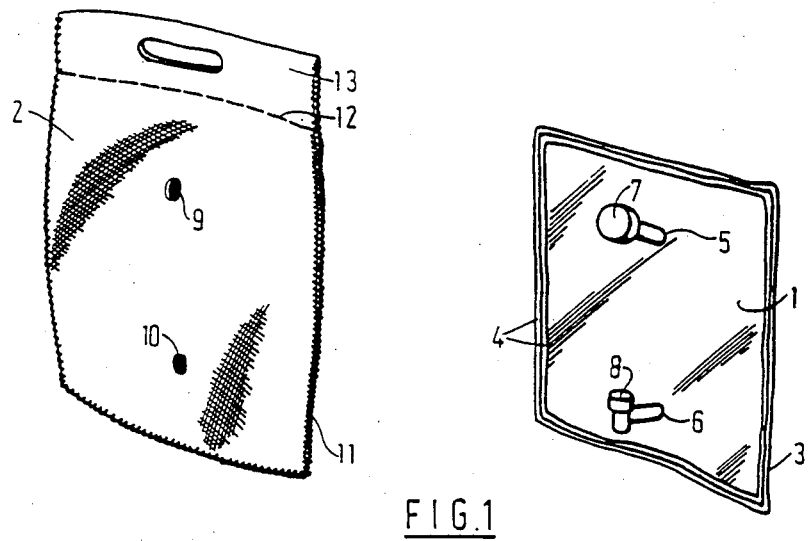
FIG. 1 is an exploded perspective view of the two bags of a pack.
Figure 2:
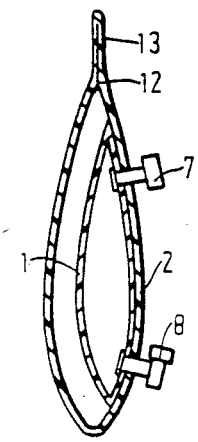
FIG. 2 is a vertical sectional view of an assembled pack.
Figure 3:
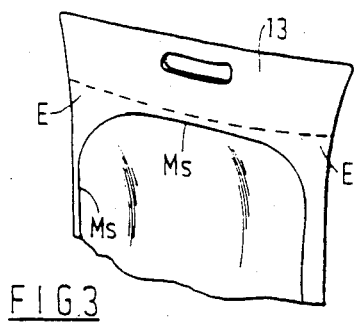
FIG. 3 is a part sectional view taken at right angles to the view of FIG. 2 during fermentation.

The pack of FIG. 1 comprises an elastic inner bag 1 located inside an outer bag 2. The inner bag 1 is formed of three plies of a laminate comprising an outer layer of NYLON, an intermediate layer of polyvinyldichloride and an innermost layer of polyethylene. The plies are heat sealed together at their margins 3 in a series of seal barriers 4 around all four edges so that the inner bag is fluidtight. Two separate holes 5,6 are present in one wall but spaced apart, one to receive the stem of a pressure valve 7 the other to receive the stem of an outlet tap 8. The holes 5,6 are located one below the other, and the respective stems are sealed to the ply in fluidtight manner. The outer bag 2 comprises two walls of woven plastics, such as polyethylene or polypropylene. The outer bag 2 has holes 9, 10 in one wall and through which pass the respective stems of the valve 7 and the tap 8. The walls are joined together along all four sides by stitching, heat sealing or contact adhesive 11 and the top edge 12 defines a carrying handle 13.

Figure 4:
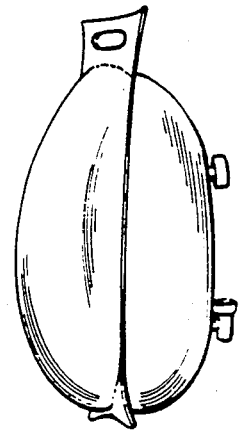
FIG. 4 is a side elevation of a pack when fermentation has taken place.
Figure 5:
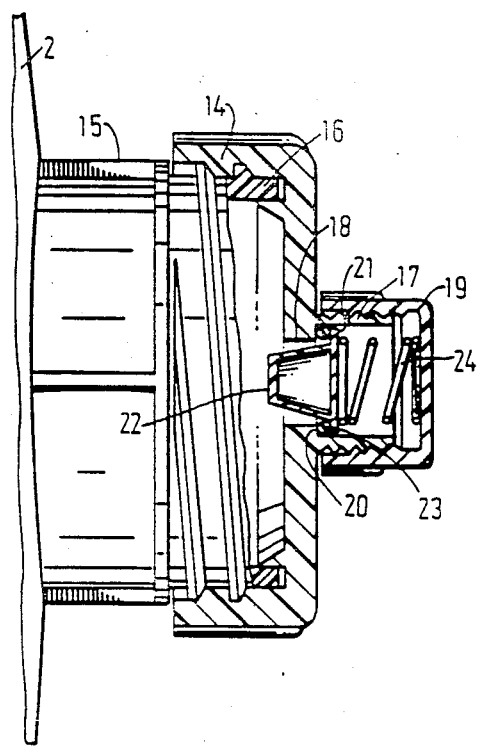
FIG. 5 is an enlarged sectional view of the pressure relief valve.

The pressure relief valve 7 shown best in FIG. 4, comprises a screw cap 14 which is threadingly engaged with the threads 16 of a stem 15 protruding from the inner bag 1. The stem 15 defines a vacuum relief gland through which a vacuum can be drawn. The cap 14 has an annular extension 17 about a hole 18 in the cap 14, and a further cap 19 engages that in screw threaded manner. The hole 18 has a floor 20 on which sits the annular base 21 of a plastic plunger 22. A 0 ring 23 is present between the floor 20 and the rim 21. A compression spring 24 is biased between the base 21 and the cap 19.

The inner bag 1 measures approximately 55 cm high and 36.5 cm wide and can hold about 11 liters of unfermented liquid or if the inner bag 1 is to hold 22 liters of unfermented liquid the inner bag 1 can measure about 55 cm high and 52 cm wide. The outer bag 2 measures about 60 cm high and 45 cm wide. The stitching 11 along the outside edges is a blanket stitch and the horizontal stitching 12 is of a different type to increase resistance to separation of the fibres woven in the wall, under pressure.

To make a pack of the invention, the inner bag is made and laid flat. Three sides of the outer bag are stitched, the inner bag 1 is put inside the outer bag 2, and the stems of the pressure relief valve 7 and the tap 8 are pushed through the respective holes 9, 10 in the wall of the outer bag 2. The remaining side of the outer bag is then stitched up. The tap is then fitted into the stem therefor. Ingredients such as liquid Brewers Wort and liquid extracts e.g. sugars are added via the stem of the pressure relief valve 7. A vacuum is then drawn via the vacuum relief gland and the pressure relief valve 7. The pack is then ready for transport in flat condition to the place of sale. The home brewer will add water via the stem of the valve 7 (the cap of which is removed for the purpose) and remaining ingredients e.g. yeast. The water containing pack is then placed on a surface e.g. the floor of a warm storage room and leant against a wall. As the fermentation takes place, carbon dioxide gas is evolved and this causes the inner bag 1 to expand. The inner bag first expands until portions thereof contact the inside wall of the outer bag 2. The inner bag then expands further as the pressure of $CO_2$ gas within it increases. When the middle of all side portions Ms of the inner bag contact the facing portion of the outer bag 2 an initial support is given. The heat sealed margin 3 of the inner bag 1 tends to be folded over the parent wall and becomes trapped between that and the facing inner wall of the outer bag, so reinforcing the edges of the bag in the central areas to increase the resistance to pressure. As the pressure within the pack increases, the top corners of the outer bag 2 tend to extend outwardly to form ears E, because the remainder takes on a barrel shape but because of the foldover of the inner bag heat sealed margin 3, it does not follow the same contour. A strong pressure resistant effect is attained, and the pack can withstand pressure of up to say 50 psig. The level of gas in the beer or other alcoholic beverage can be preset, any excess pressure escaping via the relief valve 7 which, at the appropriate time, will include a slot cut or scored in the stem and cap. When the user has exhausted the supply of liquid, the pack can be discarded because it is cheap.

The invention is not limited to the embodiment shown. For example, the inner bag component may comprise a number of individual bags within each other, the innermost one of which is gastight. The outer bag may have tucks in the corners for reinforcement. The pressure relief valve may be located near an upper corner or otherwise away from the regions of greatest stress. The inlet and the pressure relief valve may be located at separate places in the pack, and the outlet tap need not be located on the same sidewall as the pressure relief valve.

I claim:

1. A two component pressure resistant pack having a fermentation mix therein comprising an inner bag component and an outer bag component, the inner bag component being fluidtight and formed of a flexible plastics, the inner bag component having an inlet including a pressure relief valve and having an outlet tap, the outer bag component being pressure resistant, the valve and the tap of the inner bag component protruding through holes therefor in the wall of the outer bag component, the inner bag component having a sealed margin about the sides thereof, the margin being folded so that upon an increase in pressure therein caused by fermentation of the fermentation mix therein, the inner bag component will expand and trap the folded over margin between its wall and the facing inner wall of the outer bag at spaced apart locations where the outer bag component then supports the inner bag component against the pressure therein while allowing for portions of the bag wall between the supported locations to expand further.

2. A pack according to claim 1, wherein the inner bag component and the outer bag component are both generally rectangular.

3. A pack according to claim 1, wherein the volume of the inner bag component is substantially the same or greater than that of the outer bag component.

4. A pack according to claim 1, wherein the inlet protrudes through holes therefor located in a corner of the pack.

5. A pack according to claim 1 wherein the inlet valve is located in a corner of the outer bag.

6. A pack according to claim 1 wherein strands or strips of reinforcing material are present in the wall of the outer bag, in the region of the inlet valve or tap.

7. A pack according to claim 1 wherein the inlet valve is detachable by a thread connection to a stem or pipe protruding from the inlet.

8. A pack according to claim 1 wherein two or more inner bags are present in one outer bag.

* * * * *